(12) United States Patent
Yilmaz

(10) Patent No.: US 10,486,336 B2
(45) Date of Patent: Nov. 26, 2019

(54) MOTOR VEHICLE INTERIOR TRIM MATERIAL PRODUCTION PROCESS AND MOTOR VEHICLE INTERIOR TRIM COMPONENT PART

(71) Applicant: Johann Borgers GmbH, Bocholt (DE)

(72) Inventor: Faruk Yilmaz, Hamminkeln (DE)

(73) Assignee: JOHANN BORGERS GMBH, Bocholt (DE)

( * ) Notice: Subject to any disclaimer, the term of this patent is extended or adjusted under 35 U.S.C. 154(b) by 589 days.

(21) Appl. No.: 15/172,191

(22) Filed: Jun. 3, 2016

(65) Prior Publication Data

US 2016/0354950 A1 Dec. 8, 2016

(30) Foreign Application Priority Data

Jun. 5, 2015 (DE) .................. 10 2015 108 928
May 18, 2016 (EP) ..................... 16170094

(51) Int. Cl.
*B29B 11/14* (2006.01)
*B29C 51/00* (2006.01)
(Continued)

(52) U.S. Cl.
CPC ............ *B29B 11/14* (2013.01); *B29C 51/004* (2013.01); *B32B 5/08* (2013.01); *B60R 13/02* (2013.01);
(Continued)

(58) Field of Classification Search
CPC ..... B29B 11/14; B29C 51/002; B29C 51/004; B29C 51/02; B29C 51/14; B29C 51/145;
(Continued)

(56) References Cited

U.S. PATENT DOCUMENTS 3,695,962 A * 10/1972 Oosterlynck .......... D04H 1/498
156/148
4,239,670 A * 12/1980 Moorman ................ C08K 3/16
106/18.15
(Continued)

FOREIGN PATENT DOCUMENTS

CN 88102537 A 12/1988
CN 1676743 A 10/2005
(Continued)

OTHER PUBLICATIONS

Chinese Office Action based on application No. 201610389425.5 (7 pages and 7 pages of English translation) dated Jan. 19, 2018 (Reference Purpose Only).
(Continued)

*Primary Examiner* — Michael A Tolin
(74) *Attorney, Agent, or Firm* — Viering Jentschura & Partner MBB

(57) ABSTRACT

For a process for producing a motor vehicle interior trim material including or consisting at least essentially of a needlefelt which includes a fibre blend including 25-35 wt % of polyamide (PA) fibres and 65-75 wt % of polyester (PES) fibres, preferably without other, bonding fibres, and is consolidated mechanically by needling and via adhesive bonding, it shall be achieved to provide a needlefelt material, in particular a motor vehicle interior trim material, which has a visually appealing surface finish even after thermoforming in the temperature range between 150° C. and 250° C.

10 Claims, 1 Drawing Sheet

(51) Int. Cl.
*B32B 5/08* (2006.01)
*B60R 13/02* (2006.01)
*D04H 1/4334* (2012.01)
*D04H 1/435* (2012.01)
*D04H 1/46* (2012.01)
*D04H 1/488* (2012.01)
*D04H 11/08* (2006.01)
*D04H 18/02* (2012.01)
*D04H 1/587* (2012.01)
*D04H 1/558* (2012.01)
*D04H 1/64* (2012.01)
*D04H 1/4382* (2012.01)
*B29K 77/00* (2006.01)
*B29K 81/00* (2006.01)
*B29L 31/30* (2006.01)

(52) U.S. Cl.
CPC ........... *D04H 1/435* (2013.01); *D04H 1/4334* (2013.01); *D04H 1/4382* (2013.01); *D04H 1/46* (2013.01); *D04H 1/488* (2013.01); *D04H 1/558* (2013.01); *D04H 1/587* (2013.01); *D04H 1/64* (2013.01); *D04H 11/08* (2013.01); *D04H 18/02* (2013.01); *B29K 2077/00* (2013.01); *B29K 2081/06* (2013.01); *B29L 2031/3041* (2013.01); *B32B 2262/0261* (2013.01); *B32B 2262/0276* (2013.01); *B32B 2262/14* (2013.01)

(58) Field of Classification Search
CPC ..... B29L 2031/3011; B29L 2031/3041; B32B 5/022; B32B 5/08; B32B 2262/0261; B32B 2262/0276; B32B 2262/0284; B32B 2262/14; B60N 3/04; B60N 3/042; B60R 13/02; B60R 13/0212; B60R 13/0225; D04H 1/4334; D04H 1/435; D04H 1/4382; D04H 1/46; D04H 1/48; D04H 1/488; D04H 1/58; D04H 1/587; D04H 1/64; D04H 1/641; D04H 1/68; D04H 11/08; D04H 18/00; D04H 18/02; Y10T 442/688
See application file for complete search history.

(56) References Cited

U.S. PATENT DOCUMENTS

| | | | |
|---|---|---|---|
| 4,391,866 A | 7/1983 | Pickens, Jr. et al. | |
| 4,568,581 A * | 2/1986 | Peoples, Jr. | D04H 1/558 19/302 |
| 4,840,832 A * | 6/1989 | Weinle | B32B 5/26 428/156 |
| 4,927,684 A | 5/1990 | Asensio et al. | |
| 5,216,790 A | 6/1993 | Eschenbach | |
| 5,217,799 A | 6/1993 | Sumii et al. | |
| 5,672,222 A * | 9/1997 | Eschenbach | D04H 1/46 156/148 |
| 2005/0008813 A1 | 1/2005 | Demott et al. | |
| 2007/0032159 A1 | 2/2007 | Maier | |
| 2007/0163042 A1 * | 7/2007 | Baldwin | A47B 47/00 5/280 |
| 2010/0173549 A1 | 7/2010 | Bonin et al. | |
| 2014/0302285 A1 | 10/2014 | Ikeji et al. | |
| 2015/0140260 A1 | 5/2015 | Taylor et al. | |
| 2015/0251581 A1 * | 9/2015 | Jouve | D06N 7/0071 428/91 |

FOREIGN PATENT DOCUMENTS

| | | |
|---|---|---|
| CN | 1907185 A | 2/2007 |
| CN | 101046062 A | 10/2007 |
| CN | 101481854 A | 7/2009 |
| CN | 101680161 A | 3/2010 |
| CN | 202069397 U | 12/2011 |
| CN | 104095505 A | 10/2014 |
| CN | 104321478 A | 1/2015 |
| DE | 3625473 A1 | 2/1988 |
| DE | 10007556 A1 | 2/2001 |
| DE | 10164087 A1 | 7/2003 |
| DE | 112012005205 T5 | 9/2014 |
| EP | 2664702 A1 | 11/2013 |
| WO | 2004098879 A1 | 11/2004 |
| WO | 2013171099 A1 | 11/2013 |

OTHER PUBLICATIONS

Extended European Search Report based on Application No. 16 170 094.3 (7 pages) dated Oct. 31, 2016 (for reference purpose only).
German Office Action based on Application No. 10 2015 108 928.9 (6 pages) dated Feb. 15, 2016 (for reference purpose only).

* cited by examiner

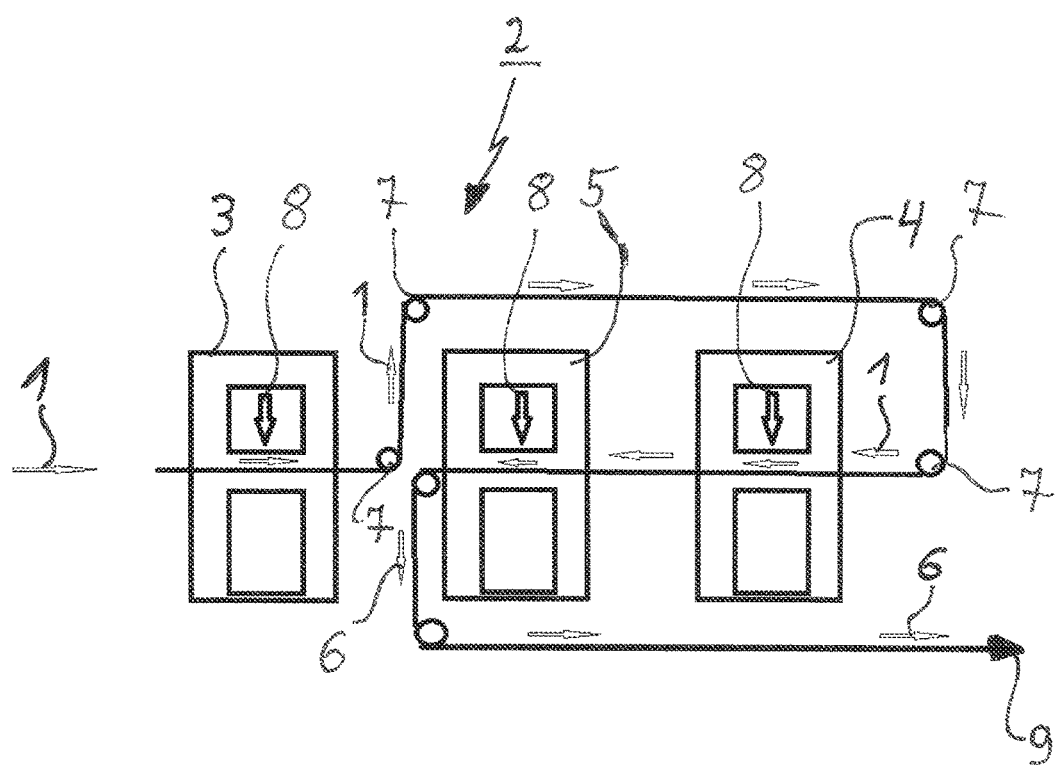

200B
MOTOR VEHICLE INTERIOR TRIM MATERIAL PRODUCTION PROCESS AND MOTOR VEHICLE INTERIOR TRIM COMPONENT PART

CROSS-REFERENCE TO RELATED APPLICATION

This application claims priority to German Patent Application Serial No. 10 2015 108 928.9, which was filed Jun. 5, 2015, and European Patent Application Serial No. 16 170 094.3, which was filed May 18, 2016, and is incorporated herein by reference in its entirety.

TECHNICAL FIELD

The present disclosure relates to a process for producing a motor vehicle interior trim material including or consisting at least essentially of a needlefelt which includes a fibre blend including 25-35 wt % of polyamide (PA) fibres and 65-75 wt % polyester (PES) fibres, preferably without other, bonding fibres, and is consolidated mechanically by needling and via adhesive bonding. The present disclosure is further directed to a motor vehicle interior trim component part.

BACKGROUND

In motor vehicle construction, it is a well-established practice to produce interior trim component parts or outfitting members for the motor vehicle interior from a needlefelt material. The needlefelts or pilefelts used here, for example Ibolours® needlefelt, are based on a fibre web consisting of a mixture of various manufactured synthetic-polymer fibres, such as polyamide (PA) fibres, polyester (PES) fibres or polypropylene (PP) fibres. This fibre web is then consolidated in a conventional manner mechanically via needling and adhesively by bonding, optionally applied onto a base material, and, if desired, subjected to a thermoforming step or process in order to mould the needlefelt material thermoplastically into a trim component part or outfitting member. Nonetheless, there continues to be a need to improve such a motor vehicle interior trim material in relation to its range of possible uses and particularly in respect of its surface appearance. This applies particularly to needlefelt materials converted by a final thermoforming operation into their final state envisioned for further use.

A fibre web composite component part combining a mixed fibre web including thermoplastic fibres and higher-melting reinforcing fibres with at least one film laminate is known from WO 2004/098879 A1. The fibre web therein consists for example of polyamide (PA) thermoplastic fibres and polyester (PE) reinforcing fibres in a mixing ratio between 80:20 and 20:80. The fibre web is consolidated by needling. A thermoforming operation is used to mould the needled mixed fibre web into an automotive interior part.

A fibre web consisting of polyester bonding fibres and polyamide matrix fibres and used in the production of moulded parts for the interior outfitting of motor vehicles is also known from DE 100 07 556 A1. The needlefelt disclosed in this document has a mixing ratio of polyamide fibre to polyester fibre in the mixing range from 10:90 to 90:10, and also a needlefelt having a stitch density of 20 to 100 stitches/cm². Furthermore, the polyester bonding fibres are processed in the crimped state and with fibre linear densities or a fineness of 1.7 to 17 dtex.

A needlefelt used for producing a floor part for motor vehicles is further known from DE 36 25 473 A1. This needlefelt may consist of a mixture of polyamide and polyester fibres which have a fineness of about 15 to 20 dtex, preferably of 17 dtex, and are needled into the needlefelt at a stitch density of 100 to 250 stitches/cm². This needlefelt is moulded into a floor part.

DE 101 64 087 A1 discloses a decorative nonwoven formed by needling of fibres into a needlefelt at a stitch density of 400 to 1000 stitches/cm² and which on its pile side has a pile height or fibre height of 1 to 6 mm.

An interior part of a motor vehicle is additionally known from DE 11 2012 005 205 B5. This interior part includes, as one ply, a carpet layer which consists of a needled fibre web and the hollow fibres of which may include polyamide fibres or polyester fibres. This needlefelt is then moulded together with other layered constituents into the interior part.

SUMMARY

The problem addressed by the present disclosure is therefore providing a solution that provides a needlefelt material, in particular a motor vehicle interior trim material, which has a visually appealing surface finish even after thermoforming in the temperature range between 150° C. and 250° C.

Motor vehicle interior trim material and motor vehicle interior trim component part not only mean that such a material and such a component part are suitable but also intended for use in the interior space of a motor vehicle.

The motor vehicle interior trim material obtained by the process according to the present disclosure is thus firstly characterized in that the fibre portion of the needlefelt consists of a fibre blend including from 25 to 35 wt % of polyamide (PA) fibres and from 65 to 75 wt % of polyester (PES) fibres. Surprisingly, the use and deployment of a fibre blend consisting of 25 wt % of polyamide (PA) fibres and from 65 to 75 wt % of polyester (PES) fibres has the effect that the thermoforming process or operation to be carried out usually in the temperature range around 200° C. following the production and processing of such a motor vehicle interior trim material or in the course of its further processing into a motor vehicle interior trim component part does not prevent the attainment thereafter of a surface texture and surface appearance that is extremely appealing and represents a distinct improvement over heretofore known surface finishes of this type. The reason for this is the admixture of the polyamide fibre portion preferably without further or additional bonding fibres. The polyamide fibres ensure that the fibres of the needlefelt return to their upright position after the thermoforming operation. The polyamide fibres also prevent the surface remaining shiny after such a thermoforming step or thermoforming operation. The desired textile appearance of the fibre side surface region of the motor vehicle interior trim material or the motor vehicle interior trim component part including the needlefelt of the present disclosure is established even after such a thermoforming treatment. The portion of 25-35 wt % of polyamide fibres which is provided by the present disclosure has turned out to be the optimum range. In order, on the other hand, to obtain adequate strength for the material produced, adequate adhesive bonding and inexpensive production overall, it has additionally turned out to be advantageous to include from 65 to 75 wt % of polyester (PES) fibres in the fibre blend in addition to the polyamide fibres.

The same advantages as mentioned above are also possessed by the motor vehicle interior trim component part proposed to solve the above problem, obtained by thermoforming a motor vehicle interior trim material according to any of claims 1 to 9, preferably in the temperature range from 150° C. to 250° C. Such thermoforming operations to effect a thermoplastic, optionally even thermoset, deformation of the needlefelt material are usually carried out in the temperature range around 200° C.

A particularly advantageous fibre blend for the needlefelt consists of 30 wt % of polyamide (PA) fibres and 70 wt % of polyester (PES) fibres.

The present disclosure further provides that the needlefelt is formed from a fibre web which includes the portion of 25 to 35 wt % of polyamide (PA) fibres and 65 to 75 wt % of polyester (PES) fibres and is consolidated mechanically by needling and also via adhesive bonding. A fibre web of this type, wherefrom the needlefelt is then produced by needling and bonding or binding, is particularly useful for producing the motor vehicle interior trim material of the present disclosure. It is in this connection then essential for the purposes of the present disclosure that, to form the needlefelt and to develop the advantageous surface appearance, a batt laid from the fibre blend passes in succession through three needling machines which each have or execute a needling motion in the vertical direction, wherein first in a first needling machine a pre-needling of the batt is effected at a stitch density between 35 and 150 stitches/cm$^2$, in particular 76 stitches/cm$^2$, thereafter a backneedling is effected in a second needling machine at a stitch density between 50 and 300 stitches/cm$^2$, in particular 110 stitches/cm$^2$, and finally a needlefelt is produced in a third or finishing type needling machine at a stitch density between 500 and 1000 stitches/cm$^2$, in particular 860-900 stitches/cm$^2$, more preferably 880 stitches/cm$^2$. In the course of this needling operation, the compact batt emerging from a lapper passes initially through the first needling machine, the needles of which punch vertically downwards through the batt in the needling direction to effect pre-needling. Backneedling then takes place in the subsequent, second needling machine, so that thereafter a penetration of the needlefelt has been effected from both sides of the needlefelt after passage through the first and second needling machines. Hence the terms pre-needling and backneedling as used herein are also to be understood as meaning that the needling is effected firstly from the foreside (foreneedling) and secondly from the reverse side thereto (backneedling) of the batt or by then already fibre web. This measure leads to the development of a homogeneous and uniform degree of fibre entanglement that leads to an excellent standard of surface consistency and a high level of abrasion resistance. The third needling machine or finishing type needling machine through which the fibre web then finally passes then effects a final form of needling which is preferably again effected as foreneedling from the foreside. However, if desired, this form of needling may also be effected as a backneedling from the back side depending on the fibre web path in the three needling machines and which of the two sides is later to be the decorative surface with the desired positive appearance. In all three needling operations, i.e. in all three needling machines, the needles all punch completely through the nonwoven.

The step of shearing the produced needlefelt on its pile side not only confers a uniform length on the fibre pile ends but also, at the same time, makes the fibre pile ends stand up in the vertical direction in the course of this shearing or cutting operation.

The step of applying the aqueous binder to bring about adhesive bonding brings about the adhesive consolidation and integration of the fibres, making it possible to achieve high abrasion strengths and fibre-anchoring forces. This includes high qualities in the in-service fastnesses.

It is particularly advantageous for producing a motor vehicle interior trim material according to various embodiments when the fibre blend is formed from polyamide fibres and polyester fibres having a fineness of 4.4-17 dtex, in particular of 5.6-7 dtex. Using polyester fibres and polyamide fibres in such a fineness will in and of itself lead to such strengths and consolidations of the fibre web and/or needlefelt in the course of the needling process that the admixture in the fibre blend of other or additional bonding fibres or binding threads can be eschewed.

It is particularly advantageous here when the fibre blend is formed with crimped polyamide fibres having a crimp of 2.5-4.5 arcs/cm, in particular 3.5 arcs/cm, and a fineness of 4.4-7 dtex, in particular of 5.6-7 dtex, as provided in elaboration of the present disclosure. The use in the batt or needlefelt fibre blend of polyamide fibres thus crimped and having such a fineness causes, firstly, the needling process to be in and of itself sufficient to ensure adequate consolidation of the web. More particularly, however, the use of such polyamide fibres causes these crimped and fine polyamide fibres, after passing through a thermoforming operation, to quickly readopt a vertical alignment, thereby providing the desired particularly good appearance of the surface aspect of the needlefelt.

In order to achieve an uprighting of the pile fibres and/or fibre pile ends in the shearing operation in a particularly advantageous manner, it is advantageous to effect shearing by means of rotating shearing cylinders of a shearing machine. In a further development of the present disclosure, therefore, the pile side of the needlefelt is shorn using one or more rotating bladed cylinders (S) of a shearing machine.

In an advantageous development for the desired improved appearance of the surface aspect of the motor vehicle interior trim material and/or of the vehicle interior trim component part produced therefrom, the fibres on the pile side of the needlefelt are shorn or cut to a length or pile height of 1.5 mm-3 mm using one or more rotating bladed cylinders (S) of a shearing machine, which again is an advantageous embodiment of the present disclosure. This ensures that a defined proportion of the vertically standing fibre pile is shorn/cut to a defined height by the rotating blades and is homogenized by the rotational movement of the blades of rotating cylinders. In the shearing operation, the fibre pile ends are cut off and the ends of the subsequently cut fibres are vertically uprighted.

It is particularly advantageous to use an aqueous binder including polymers from styrene-butadiene rubber, styrene-acrylate, acrylate or mixtures of carboxylated styrene-acrylates. In a further elaboration of the present disclosure, therefore, the aqueous binder, in particular the aqueous dispersion, is applied onto that side of the shorn needlefelt which is remote from the shorn pile side in a minimum foam add-on process and in a subsequent step is dried to form a binder film bringing about the adhesive bonding.

In an advantageous way to apply the aqueous binder, the shorn needlefelt is coated on the side opposite the pushed-through pile with an aqueous dispersion in a foam minimal add-on process (in a kiss roll process for example) and subsequently dried while at the same time the film bringing about the adhesive bonding is formed. In a further development, therefore, the present disclosure also provides that the aqueous binder, in particular the aqueous dispersion, is applied onto that side of the shorn needlefelt which is remote from the shorn pile side in a minimum foam add-on process and in a subsequent step is dried to form a binder film bringing about the adhesive bonding.

The process of producing the motor vehicle interior trim material may then additionally also provide the step of thermoforming the needlefelt obtained.

There are special use scenarios but optionally also just in preparation for the practice of the desired thermoforming operation where it may be advantageous to apply the needlefelt onto a base material. The present disclosure is therefore finally also defined in that the needlefelt has been applied onto a base material.

The present disclosure finally provides that the needlefelt is thermoformed after the step of drying the aqueous binder or after the step of applying the needlefelt onto a base material, this having turned out to be a particularly favourable time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a schematic depiction of a batt passing through three needling machines connected in series as regards the direction of transport.

DETAILED DESCRIPTION

The production of the motor vehicle interior trim material of the present disclosure and also of the motor vehicle interior trim component part is essentially effected using the same equipment and in the same processing steps as hitherto customary for needlefelt materials of this type. A very homogeneous mixture is prepared of a fibre blend consisting of from 25 to 35 wt %, preferably 30 wt %, of polyamide (PA) fibres and from 65 to 75 wt %, preferably 70 wt %, of polyester (PES) fibres. In the illustrative embodiment, the polyamide fibres and the polyester fibres have a fineness of 5.6 to 7 dtex and the polyamide fibres additionally have a crimp of 3.5 arcs/cm. A batt is produced from this fibre mixture in a conventional manner, i.e. by laying in a lapper. Emerging from the lapper, the compact batt merely depicted as an arrow in FIG. 1 and referred to therein as 1, is sent to a needling apparatus referred to overall as 2. The batt 1 then passes through this needling apparatus 2 in the direction of arrows 1, initially through a first needling machine 3, thereafter through a second needling machine 4 and finally through a third needling machine 5. The product emerging from the third needling machine 5 is an already-needled needlefelt, as then expressed in FIG. 1 by designating the arrow with reference sign 6. The batt 1 is initially sent to the first needling machine 3 where it is fore- or pre-needled by being punched through from above by needles being moved vertically downwards. In this first needling machine 3, the batt 1 in the illustrative embodiment is punched at a stitch density of 76 stitches/cm$^2$. Emerging from the first needling machine 3, the batt 1 is led over a plurality of change-of-direction rolls 7 so that the batt 1 then travels with that side facing the needling side 8 of the second needling machine 4 which in the first needling machine 3 is that side of batt 1 which faces away from the needling side 8 thereof. The second needling machine 4 thus effects a backneedling from the back side of batt 1, at a stitch density of 110 stitches/cm$^2$ in the illustrative embodiment. The needles in all three needling machines 3 to 5 all punch completely through the batt 1, and therefore even as it emerges from the second needling machine 4 the batt 1, which at this point will already be the first needlefelt, in effect already evinces an interpenetration that results in a homogenous and uniform entanglement of the fibres which is the basis for the consistently uniform surface aspect of the ready-needled needlefelt 6 and for the abrasion resistance to be achieved. After emerging from the second needling machine 4, the batt 1 or the already formed first needlefelt, finally passes through the third or finishing type needling machine 5 where the batt 1 or the first needlefelt is needled in the third needling machine 5 again with the same orientation as in the second needling machine 4. That is, the same surface side of batt 1 faces the needling side 8 in the third needling machine 5 as in the second needling machine 4. As in the first needling machine 3 and the second needling machine 4, vertically aligned needles pass vertically downwards through the batt 1 in the third needling machine 5 as well, at a stitch density which in the illustrative embodiment here of 880 stitches/cm$^2$. In this finishing type needling machine 5, the vertical alignment of the fibres is made manifest and amplified and also a dense and stable pile produced. So a needlefelt 6 has been produced from the batt 1 by needling. This needlefelt 6 is then sent to produce the motor vehicle interior trim material in subsequent stages and process steps, first to a shearing apparatus and thereafter to a binder applicator apparatus which follow the needling apparatus 2 in arrow direction 9. The needlefelt 6 is shorn on its pile side in the shearing apparatus. The illustrative embodiment does this via a shearing machine which includes at least one rotating cylinder (a bladed cylinder) equipped with at least one shearing blade, to shear or cut the fibres on the pile side of the needlefelt 6 to a length or pile height of 1.5 to 3 mm, in the illustrative embodiment to a pile height of 2 mm. The region which is to be cut off from the vertically upright fibre pile is cut by the rotating blade(s) down to the desired pile height of 2 mm in this instance. In the process, the fibre pile is homogenized, i.e. uniformized, by the rotating blade(s) while at the same time, in the course of the shearing or cutting operation, the fibre piles ends are cut off and the cut fibre ends left standing are made to stand up vertically.

After shearing, the shorn needlefelt is sent to the binder applicator apparatus whereby an aqueous dispersion is provided to the shorn needlefelt on its back side, i.e. the side opposite the pushed pile. The aqueous dispersion includes an aqueous binder including the polymers from the group styrene-butadiene rubber, styrene-acrylate, acrylate or mixtures of carboxylated styrene-acrylates. This aqueous binder or dispersion is applied onto that side of the shorn needlefelt which is remote from the shorn pile side in a minimum foam add-on process and in a subsequent step is dried to form a binder film bringing about the adhesive bonding. This adhesive consolidation through adhesive bonding is very important for fibre anchorage, since high abrasion resistances and fibre-anchoring forces are achievable thereby that include high qualities in the in-service fastnesses.

The fibre blend in the form of the batt 1 formed therefrom is subjected to successive operations in which it is mechanically consolidated by needling. At least one of these processing steps is configured such that a pilefelt is formed in the course of needling. In addition to mechanical consolidation, the fibre blend is subjected to an adhesive consolidation, i.e., a gluing effect. To this end, a correspondingly suitable binder is admixed to the fibre blend in the course of the manufacturing operation leading to the needlefelt. The processing steps including needling also include a finish type of needling operation or a processing step wherein the fibre blend is needled using a stitch density of 500 to 1000 stitches/cm², preferably 860 to 900 stitches/cm², in particular 880 stitches/cm². After the last needle type processing step, the needlefelt obtained with a surface formed particularly as pilefelt is shear trimmed back to a uniform fibre length, in particular to a pile height between 1.5 mm to 3 mm after shearing.

Thereafter the needlefelt thus obtained is subjected to a thermoforming process or operation, in particular customary thermoplastic moulding in the temperature range between 150° C. and 250° C., preferably around 200° C. It may additionally be provided here that, before passing through the thermoforming operation, the web material is applied, in a conventional and known manner, onto a base material, so the needlefelt undergoes moulding together with the base material. After passing through this thermoforming operation, the needlefelt obtained constitutes a motor vehicle interior trim material which may optionally also already constitute a motor vehicle interior trim component part unless it is still to be subjected to one or more further, subsequent processing steps and optionally has already been fabricated in the desired size.

The production of the needlefelt and/or of the motor vehicle interior trim material of the present disclosure advantageously utilizes polyamide fibres having a fineness of 5.6 to 7 dtex, in particular 6.7 dtex.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A process for producing a motor vehicle interior trim material, wherein the process comprises:
    providing a batt comprising a foreside and a backside, the backside being opposite the foreside, wherein the batt comprises a fiber blend, the fiber blend comprising 25-35 wt % of polyamide fibers and 65-75 wt % of polyester fibers;
    foreneedling the foreside of the batt in a first needling machine at a needlepunching density ranging from 35 punches/cm² to 150 punches/cm² to form a foreneedled batt, the foreneedled batt having a foreside and backside which correspond to the same sides as the foreside and backside of the batt, respectively;
    passing the foreneedled batt to a second needling machine;
    backneedling the backside of the foreneedled batt in the second needling machine at a needlepunching density ranging from 50 punches/cm² to 300 punches/cm² to form a backneedled batt, wherein the backneedling occurs with an increased needlepunching density as compared to the needlepunching density of the foreneedling;
    passing the backneedled batt to a third needling machine; and
    producing a needlefelt in the third needling machine at a needlepunching density ranging from 500 punches/cm² to 1000 punches/cm²,
    wherein the needlefelt comprises a pile side comprising pile and a remote side, the remote side being opposite the pile side; and
    applying an aqueous binder to the remote side of the needlefelt.

2. The process according to claim 1, wherein the polyamide fibers and the polyester fibers have a fineness of 4.4-17 dtex.

3. The process according to claim 1, wherein the polyamide fibers are crimped polyamide fibers having a crimp of 2.5-4.5 arcs/cm, and wherein the crimped polyamide fibers comprise a fineness of 4.4-17 dtex.

4. The process according to claim 1, further comprising shearing the pile of the needlefelt with one or more rotating bladed cylinders of a shearing apparatus.

5. The process according to claim 4, wherein the pile is cut to a pile height ranging from 1.5 mm to 3 mm in the shearing step.

6. The process according to claim 1, wherein the aqueous binder comprises one or more polymers selected from the group consisting of a styrene-butadiene rubber, a styrene-acrylate, an acrylate, and carboxylated styrene-acrylates.

7. The process according to claim 1, wherein the step of applying the aqueous binder comprises a kiss roll process, and the process further comprises subsequently drying the applied aqueous binder to form a binder film and to bring about adhesive bonding of the needlefelt.

8. The process according to claim 7, further comprising applying the needlefelt onto a base material.

9. The process according to claim 8, further comprising thermoforming the needlefelt after drying the aqueous binder or after applying the needlefelt onto a base material.

10. The process according to claim 9, wherein the thermoforming occurs at a temperature ranging from about 200° C. to 250° C.

* * * * *